(12) United States Patent
Ulrey et al.

(10) Patent No.: US 8,783,031 B2
(45) Date of Patent: *Jul. 22, 2014

(54) METHOD AND SYSTEM FOR PROVIDING AIR TO AN ENGINE

(75) Inventors: Joseph Norman Ulrey, Dearborn, MI (US); Jeffrey Allen Doering, Canton, MI (US); Ross Dykstra Pursifull, Dearborn, MI (US); Donald J. Lewis, Beaverton, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/452,735

(22) Filed: Apr. 20, 2012

(65) Prior Publication Data

US 2012/0247101 A1 Oct. 4, 2012

Related U.S. Application Data

(63) Continuation of application No. 13/075,031, filed on Mar. 29, 2011, now Pat. No. 8,161,746.

(51) Int. Cl.
*F02B 33/44* (2006.01)
*F02D 23/00* (2006.01)
*F02M 25/07* (2006.01)
*F02B 33/00* (2006.01)

(52) U.S. Cl.
USPC ........... 60/611; 60/605.1; 60/605.2; 123/564; 123/561; 701/103; 701/108

(58) Field of Classification Search
USPC ............. 60/611, 601, 602, 605.1, 605.2; 123/559.1, 562, 564; 701/103, 108
IPC .......................... F02D 21/00,9/02; F02M 25/07
See application file for complete search history.

(56) References Cited

U.S. PATENT DOCUMENTS

| | | | |
|---|---|---|---|
| 3,541,784 A | 11/1970 | Haase | |
| 4,233,814 A | 11/1980 | Thore | |
| 5,239,960 A | 8/1993 | Sasaki et al. | |
| 6,349,708 B1 * | 2/2002 | Horlacher et al. | 123/559.3 |
| 7,047,742 B2 | 5/2006 | Kono et al. | |
| 7,261,086 B2 | 8/2007 | Nuang | |
| 7,296,561 B2 | 11/2007 | Shirakawa et al. | |
| 7,793,500 B2 | 9/2010 | Igarashi | |
| 7,895,838 B2 | 3/2011 | Ono | |
| 8,001,778 B2 * | 8/2011 | Sun | 60/605.2 |
| 8,161,746 B2 * | 4/2012 | Ulrey et al. | 60/605.2 |
| 2001/0022174 A1 | 9/2001 | Suzuki et al. | |

(Continued)

FOREIGN PATENT DOCUMENTS

| | | | | |
|---|---|---|---|---|
| GB | 2214979 A | * | 9/1991 | ............. F02D 23/02 |
| JP | 62170721 A | * | 7/1987 | ............. F02B 33/44 |
| JP | 01092524 A | * | 4/1989 | ............. F02B 33/44 |
| JP | 1170720 A | | 7/1989 | |
| JP | 2011069263 A | | 4/2011 | |

*Primary Examiner* — Thai Ba Trieu (74) *Attorney, Agent, or Firm* — Julia Voutyras; Alleman Hall McCoy Russell & Tuttle LLP (57) ABSTRACT

Systems and methods for supplying air to an engine are disclosed. In one example, an air inlet throttle is at least partially closed in response to a change in engine torque request. In another example, the air inlet throttle is adjusted in conjunction with adjusting an engine throttle. The approach can reduce compressor noise and may reduce the possibility of compressor surge.

12 Claims, 6 Drawing Sheets

(56) References Cited

U.S. PATENT DOCUMENTS

| | | |
|---|---|---|
| 2007/0137199 A1 | 6/2007 | Magner et al. |
| 2008/0223038 A1 | 9/2008 | Lutz et al. |
| 2009/0038309 A1 | 2/2009 | Cocca et al. |
| 2009/0077965 A1 | 3/2009 | Pursifull |
| 2009/0198432 A1 | 8/2009 | Tabata et al. |
| 2009/0210138 A1 | 8/2009 | Hokuto et al. |
| 2010/0131212 A1 | 5/2010 | Heinkele et al. |
| 2011/0023842 A1 | 2/2011 | Kurtz |
| 2012/0304641 A1 * | 12/2012 | Iwata et al. ............ 60/605.2 |

* cited by examiner

METHOD AND SYSTEM FOR PROVIDING AIR TO AN ENGINE

CROSS REFERENCE TO RELATED APPLICATIONS

The present application is a continuation of U.S. patent application Ser. No. 13/075,031 filed Mar. 29, 2011, the entire contents of which are incorporated herein by reference for all purposes.

BACKGROUND/SUMMARY

Engine efficiency can be increased while providing a desired engine output capacity by lowering engine displacement and compressing air supplied to the engine. Lowering the engine displacement can reduce engine pumping losses and pressurizing engine intake air can increase output power of a smaller displacement engine. Consequently, a smaller displacement engine can provide improved fuel economy as compared to a larger displacement engine while providing an amount of power that is similar to the larger displacement engine. However, compressors can experience surge when flow through the compressor is low and when the pressure differential across the compressor is relatively high. Surge may be undesirable for several reasons including because surge may induce undesirable noise from the engine air intake system.

The inventors herein have recognized the above-mentioned disadvantages and have developed a method for supplying air to an engine, comprising: controlling air flow to a compressor via a first throttle; controlling air flow from the compressor to engine cylinders via a second throttle; and at least partially closing the first throttle during a condition of surge of the compressor.

By closing a throttle upstream of a compressor during conditions of compressor surge it may be possible to reduce the amount of noise that is noticeable to a vehicle operator. For example, if a compressor bypass valve is opened to reduce surge, the sound of air bypassing the compressor and returning to the compressor inlet may be less noticeable when a throttle located upstream of the bypass valve and compressor in a direction of air flow into the engine is at least partially closed. Closing the throttle can impede propagation of should waves from the bypass valve to the air inlet air box so as to reduce the amount of sound emanating from the air inlet air box. As a result, the amount of compressor surge induced noise may be reduced. In addition, boost pressure can be conserved by closing an air inlet throttle during surge conditions. Thus, instead of releasing compressed air to the atmosphere via the air box, the compressed air may be held within the engine air intake system where it can be consumed by the engine.

The present description may provide several advantages. Specifically, the approach may reduce engine noise by limiting noise emanating from the air inlet air box. Further, the approach can conserve pressurized air for engine use rather than releasing the compressed air to atmosphere. Consequently, the approach may reduce the amount of work used to pressurize engine air. As a result, the approach may improve fuel economy since the work put into compressing air may be recovered.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
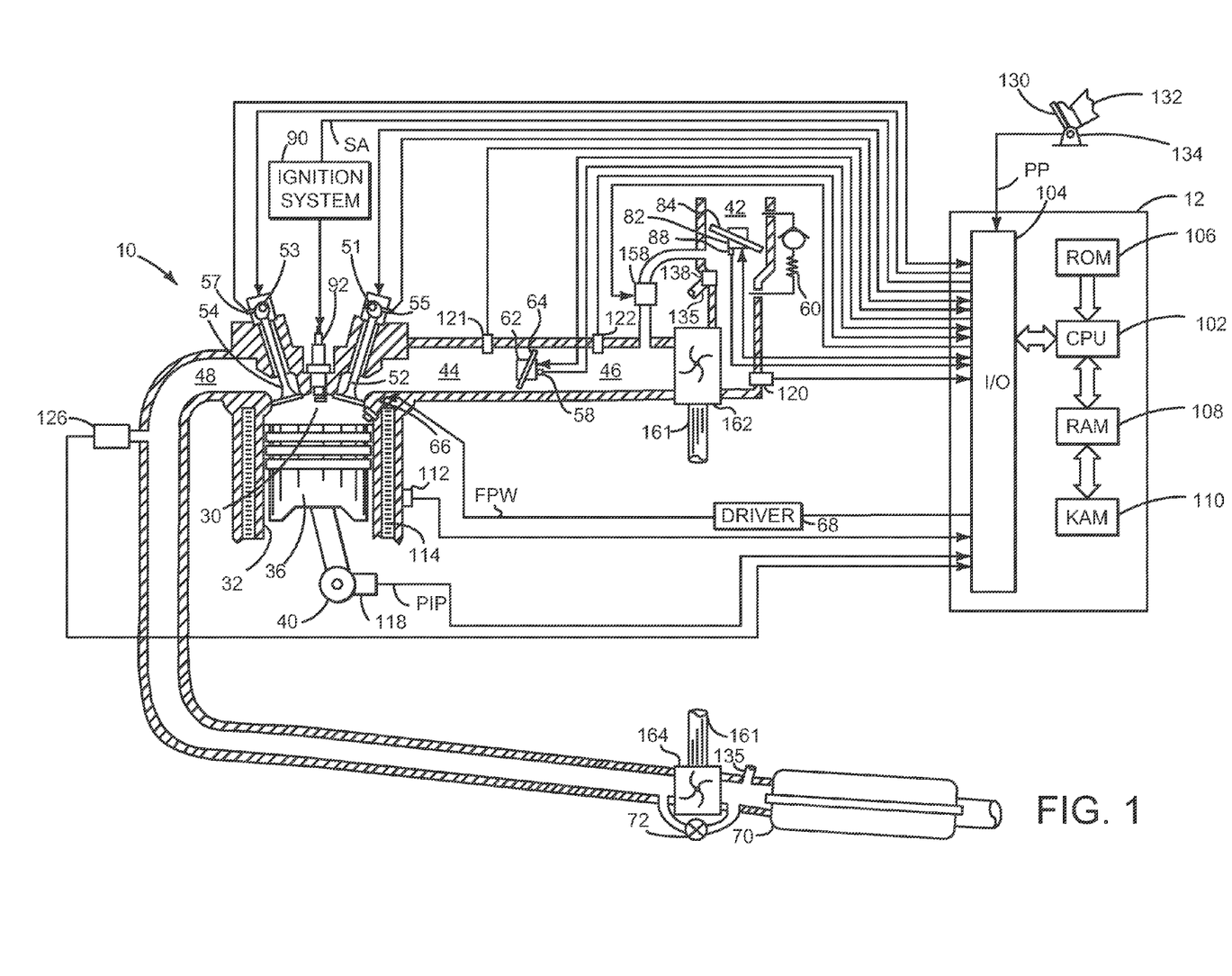
FIG. 1 shows a schematic depiction of an engine.

The present description is related to providing air to an engine. In particular, the present description provides an approach for reducing the possibility of producing noise during conditions of low flow and a higher pressure ratio across a compressor. FIG. 1 shows an example system for providing air to an engine. FIGS. 2 through 5 show simulated signals of interest when providing air to an engine. FIG. 6 shows a method for providing air to an engine and the control illustrated in FIGS. 2-5.

Referring to FIG. 1, internal combustion engine 10, comprising a plurality of cylinders, one cylinder of which is shown in FIG. 1, is controlled by electronic engine controller 12. Engine 10 includes cylinder 30 and cylinder walls 32 with piston 36 positioned therein and connected to crankshaft 40. Cylinder 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46 to engine cylinder 30.

Exhaust gas recirculation (EGR) is provided via ERG passage 135 and EGR valve 138 to the engine air intake system at a position downstream of air intake system (AIS) throttle 82 from a location in the exhaust system downstream of turbine 164. EGR may be drawn from the exhaust system to the intake air system when AIS throttle 82 is partially closed. Throttle plate 84 controls air flow to compressor 162. The AIS may be electrically controlled and its position may be adjusted based on optional position sensor 88. Optional check valve 60 allows air to flow to bypass AIS throttle 82 when a pressure differential of more than a predetermined amount is present across AIS throttle 82. Thus, bypass valve 60 can prevent excess vacuum from developing between AIS throttle 82 and compressor 162.

Compressor 162 draws air from air intake 42 to supply boost chamber 46. In some examples, air intake 42 may include an air box (not shown) with filter. Exhaust gases spin turbine 164 which is coupled to compressor 162 via shaft 161. Vacuum operated waste gate actuator 72 allows exhaust gases to bypass turbine 164 so that boost pressure can be controlled under varying operating conditions. Compressor bypass valve 158 (CBV) provides a path around compressor 162 so that air may move from the compressor outlet to the compressor inlet so as to reduce a pressure that may develop across compressor 162. CBV 158 may be opened and closed via an electric signal from controller 12. In some examples, an additional pressure sensor (not shown) may be positioned between AIS throttle and an inlet of compressor 162 to provide pressure information to controller 12.

Distributorless ignition system 90 provides an ignition spark to cylinder 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position (PP) adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft (PIP) from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Figure 2:
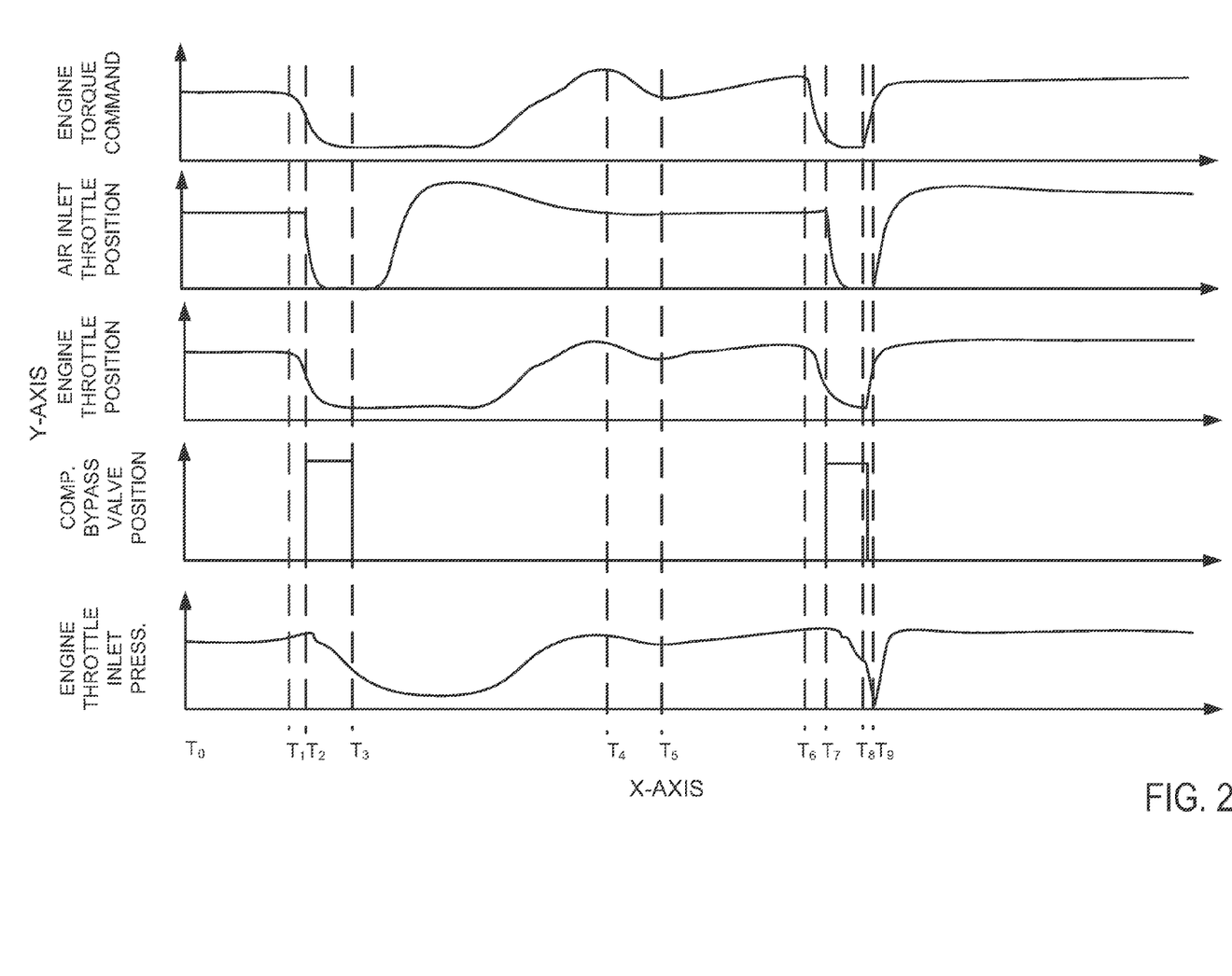
FIGS. 2-5 show simulated signals of interest during engine operation.
Figure 3:
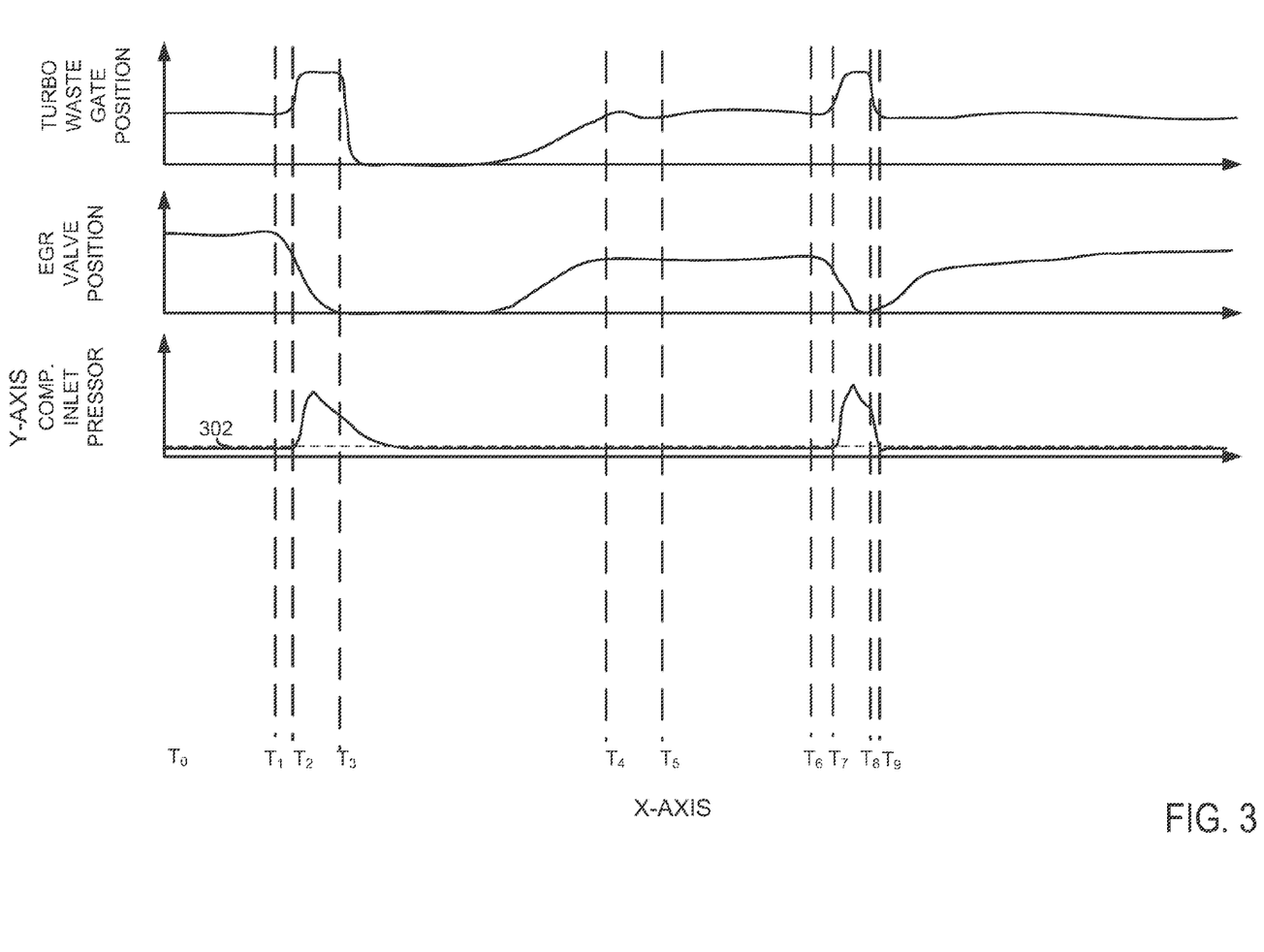

Referring now to FIGS. 2 and 3, simulated signals of interest during an engine operating sequence are shown. The signals in the sequence may be provided according to the method of FIG. 6 via the system of FIG. 1. The signals of FIGS. 2 and 3 take place during the same sequence and vertical markers $T_0$-$T_8$ provide time references for events of interest.

The first signal from the top of FIG. 2 represents an engine torque command. The engine torque command may be generated via a driver command or a command of a controller (e.g., a hybrid controller). The Y axis represents requested engine torque a requested engine torque increases in the direction of the Y axis arrow. The X axis represents time and time increase from the left to right side of FIG. 2.

The second signal from the top of FIG. 2 represents a position of an AIS throttle (e.g., throttle 82 of FIG. 1). The AIS throttle opening increases in the direction of the Y axis arrow. The X axis represents time and time increases from the left to right side of FIG. 2.

The third signal from the top of FIG. 2 represents a position of an engine throttle (e.g. throttle 62 of FIG. 1). The engine throttle opening increases in the direction of the Y axis arrow. The X axis represents time and time increases from the left to right side of FIG. 2.

The fourth signal from the top of FIG. 2 represents the state of a CBV (e.g. CBV 158 of FIG. 1). The CBV is open when the signal is in a high state and closed when the signal is in a low state. The X axis represents time and time increases from the left to right side of FIG. 2.

The fifth signal from the top of FIG. 2 represents engine throttle inlet pressure. For example, engine throttle inlet pressure may be sensed in boost chamber 46 via pressure sensor 122. Engine inlet pressure increases in the direction of the Y axis arrow. The X axis represents time and time increases from the left to right side of FIG. 2.

The first signal from the top of FIG. 3 represents a turbocharger waste gate position. The waste gate opening increases in the direction of the Y axis arrow. The X axis represents time and time increases from the left to right side of FIG. 3.

The second signal from the top of FIG. 3 represents a position of an EGR valve. The EGR valve opening increases in the direction of the Y axis arrow. The X axis represents time and time increases from the left to the right side of FIG. 3.

The third signal from the top of FIG. 3 represents pressure in an air intake system upstream of an air compressor. The pressure increases in the direction of the Y axis arrow. The X axis represents time and time increases from the left to the right side of FIG. 3. Horizontal line 302 represents atmospheric pressure. A pressure above horizontal line 302 represents a positive pressure and a pressure below horizontal line 302 represents a vacuum.

At time $T_0$, the engine torque command is between a middle level and a higher level. In one example, the engine torque level at time $T_0$ represents an engine torque level at a vehicle cruising speed (e.g. 60 MPH). The AIS throttle is partially closed so as to create a small pressure depression between the AIS throttle and the compressor. Since the EGR valve is also partially opened, EGR can flow to the engine at time $T_0$. The engine throttle is also partially open so that the engine receives an air amount for providing the commanded engine torque. The engine throttle inlet pressure is partially elevated so that air is available to provide the commanded engine torque. The turbocharger waste gate is also partially open at time $T_0$ and the compressor inlet pressure is slightly less than atmospheric pressure.

At time $T_1$, the engine torque command begins to decrease. The engine torque command may decrease so that the vehicle which the engine propels can decrease in speed. The engine throttle position also starts to close in response to the decreasing engine torque command. Closing the throttle reduces the engine air amount and air flow into the engine so as to reduce engine torque. The engine throttle inlet pressure rises as the engine throttle closes. The flow rate through the compressor also decreases since the air flow into the engine is reduced by closing the engine throttle. The EGR valve also begins to close as the engine torque demand decreases so that the cylinder dilution does not increase.

At time $T_2$, the AIS throttle begins to close and the CBV is opened in response to a higher differential pressure across the turbocharger compressor and a low flow rate through the turbocharger compressor. Such conditions may be indicative of turbocharger compressor surge. Further, the turbocharger waste gate is opened so that less exhaust energy is delivered to rotate the compressor. By opening the waste gate and the CBV compressor surge may be reduced. Closing the AIS throttle can reduce compressor noise and noise that may be produced by opening the CBV. Further, as can be seen from the engine throttle inlet pressure, closing the AIS throttle traps air between the AIS throttle and the compressor so that the air can be drawn to the engine rather than exiting the engine intake air system via an air box. Accordingly, air is drawn out of boost chamber 46 by pumping engine cylinders after the AIS throttle is closed. Opening the CBV allows pressure to equalize at the inlet and outlet of the compressor.

It should be noted that the pressure differential across the compressor where the possibility of surge is reduced may vary for different flow rates and compressors. Therefore, the CBV and turbocharger waste gate may be closed at different times depending on compressor operating conditions.

At time $T_3$, the engine throttle inlet pressure is reduced and a pressure differential across the compressor is reduced enough at the present compressor flow rate to limit compressor surge. Therefore, the CBV and the turbocharger waste gate are closed. Shortly thereafter, the AIS throttle is opened. The AIS may be opened when the throttle inlet pressure, intake manifold pressure, or the compressor inlet pressure decrease to less than a threshold pressure (e.g., atmospheric pressure). By allowing a pressure of the air intake system to decrease, the work put into compressing the air may be recovered. Further, the possibility of back flow through the compressor may be reduced. In other examples, the AIS may be opened after a predetermined number of counted engine events have passed (e.g., engine combustion events or engine cylinder cycles). In still other examples, the AIS may be opened after a predetermined amount of time has passed since the AIS throttle was closed. The AIS may also be opened when the engine torque command increases. The AIS throttle is shown moving to a fully open position. However, the AIS throttle may be moved to a position less than fully open.

Between time $T_3$ and time $T_4$, the engine torque command increases and the AIS is partially closed after being at a full open position. The engine throttle position moves as the engine torque command changes so as to provide the commanded engine torque. The engine throttle inlet pressure also increases so that the engine may provide the commanded torque. The waste gate position gradually changes and begins to open as does the EGR valve.

Between times $T_4$ and time $T_5$, engine torque is decreased, however, the engine torque is not reduced at a rate that lowers compressor flow and increases the pressure differential across the compressor so as to induce compressor surge. Consequently, the AIS throttle remains open and the CBV remains closed. The engine throttle position is adjusted so as to provide the commanded engine torque.

At time $T_6$, the engine torque command is again reduced. The engine throttle position begins to close shortly after the engine torque command begins to decrease as does the EGR valve. The engine throttle inlet pressure increases as the engine throttle is closed. The rising pressure at the throttle inlet reduces the flow through the compressor and increases the delta pressure across the compressor. As a result, the compressor enters a surge condition.

At time $T_7$, the AIS throttle begins to close in response to the compressor entering a surge condition. The CBV also opens in an effort to reduce the pressure differential across the compressor. The throttle inlet pressure begins to decrease as air flows from the compressor outlet to the compressor inlet via the CBV. The waste gate is also opened at time $T_7$, in an effort to reduce compressor speed.

At time $T_8$, the engine torque command is increased. The engine torque command is increased before the pressure differential across the compressor reaches a level where the CBV may be closed and the AIS throttle opened. The increasing torque demand causes the CBV to close and engine throttle to open. Therefore, the engine throttle and the CBV respond to the increasing torque command. Opening the engine throttle allows the pressure downstream of the AIS throttle to decrease to below atmospheric pressure at time $T_9$. As such, the possibility of reverse air flow through the compressor may be reduced. The AIS throttle begins to open at time $T_9$ to allow additional air flow into the engine. In other examples, the AIS and CBV may be opened and closed respectively responsive to the compressor flow and delta pressure across the compressor. In still other examples, the CBV and the AIS throttle may be adjusted responsive to engine throttle position.

In the present example, the engine throttle is opened near time $T_8$ so that the engine air flow and torque increase responsive to the increasing engine torque demand. The increasing engine air flow increases the air flow through the compressor so that the compressor exits the surge condition. Therefore, the waste gate moves to a partially open position and the EGR valve opening increases to allow EGR to begin flowing to the engine.

Figure 4:
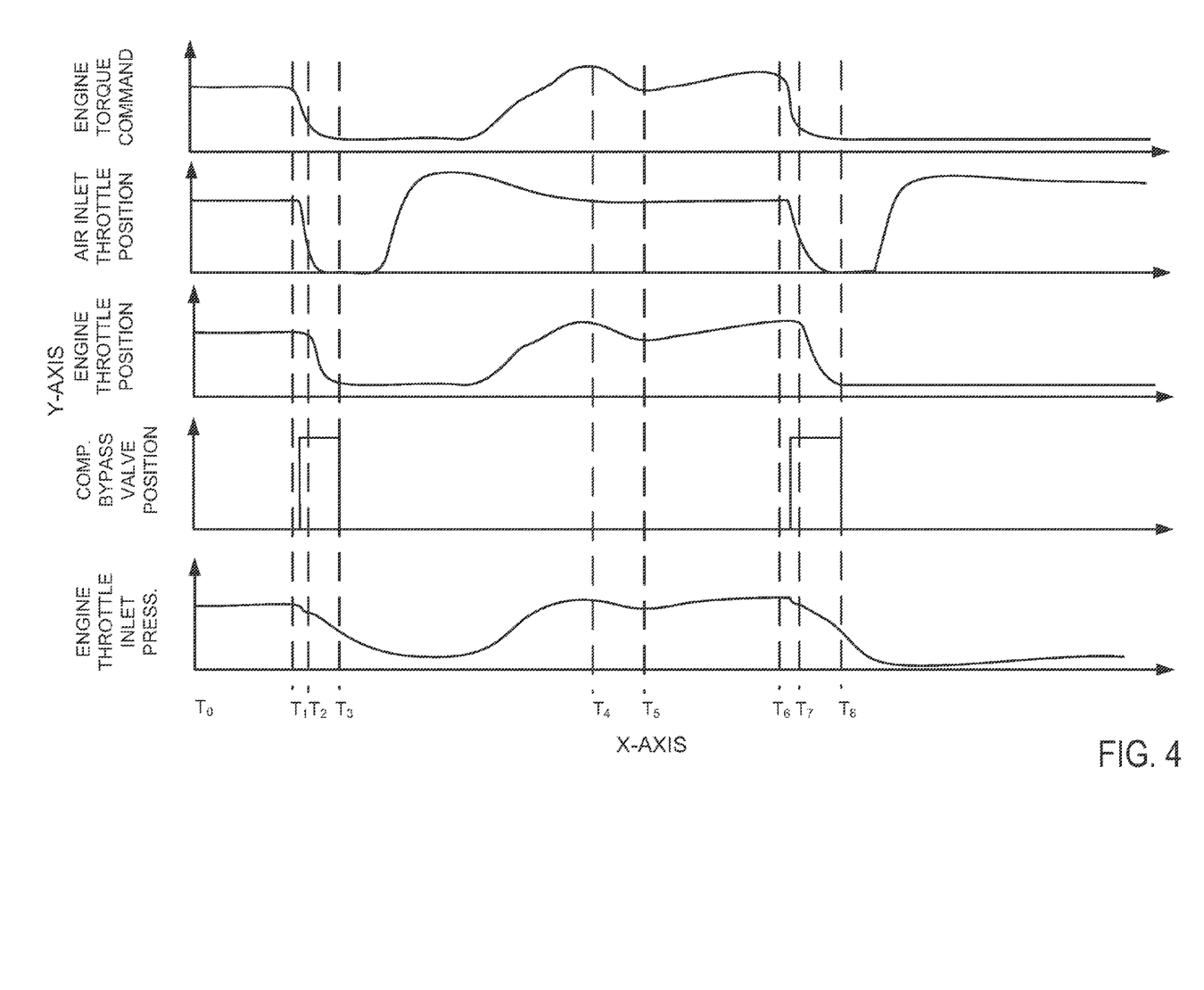
Figure 5:
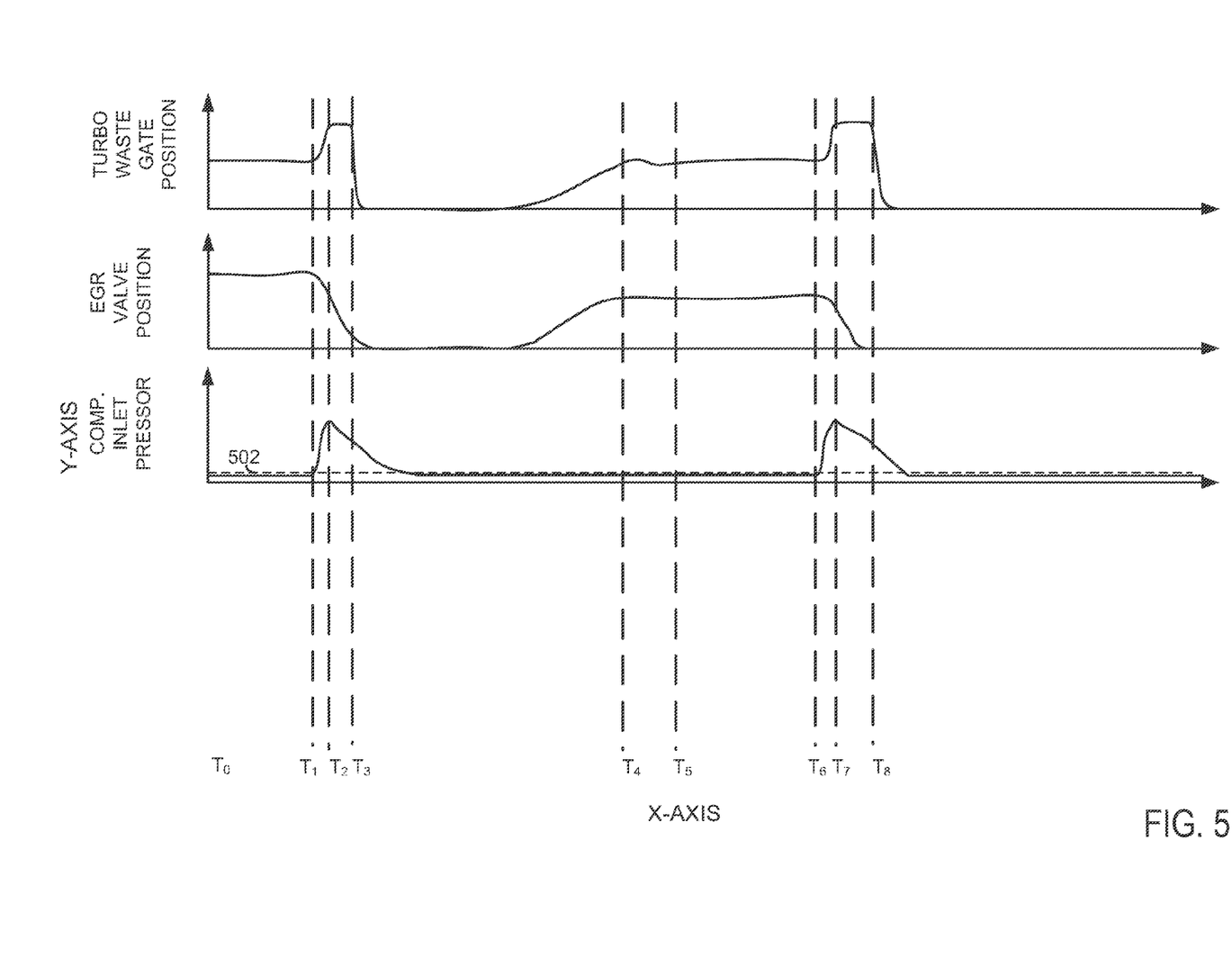
Figure 6:
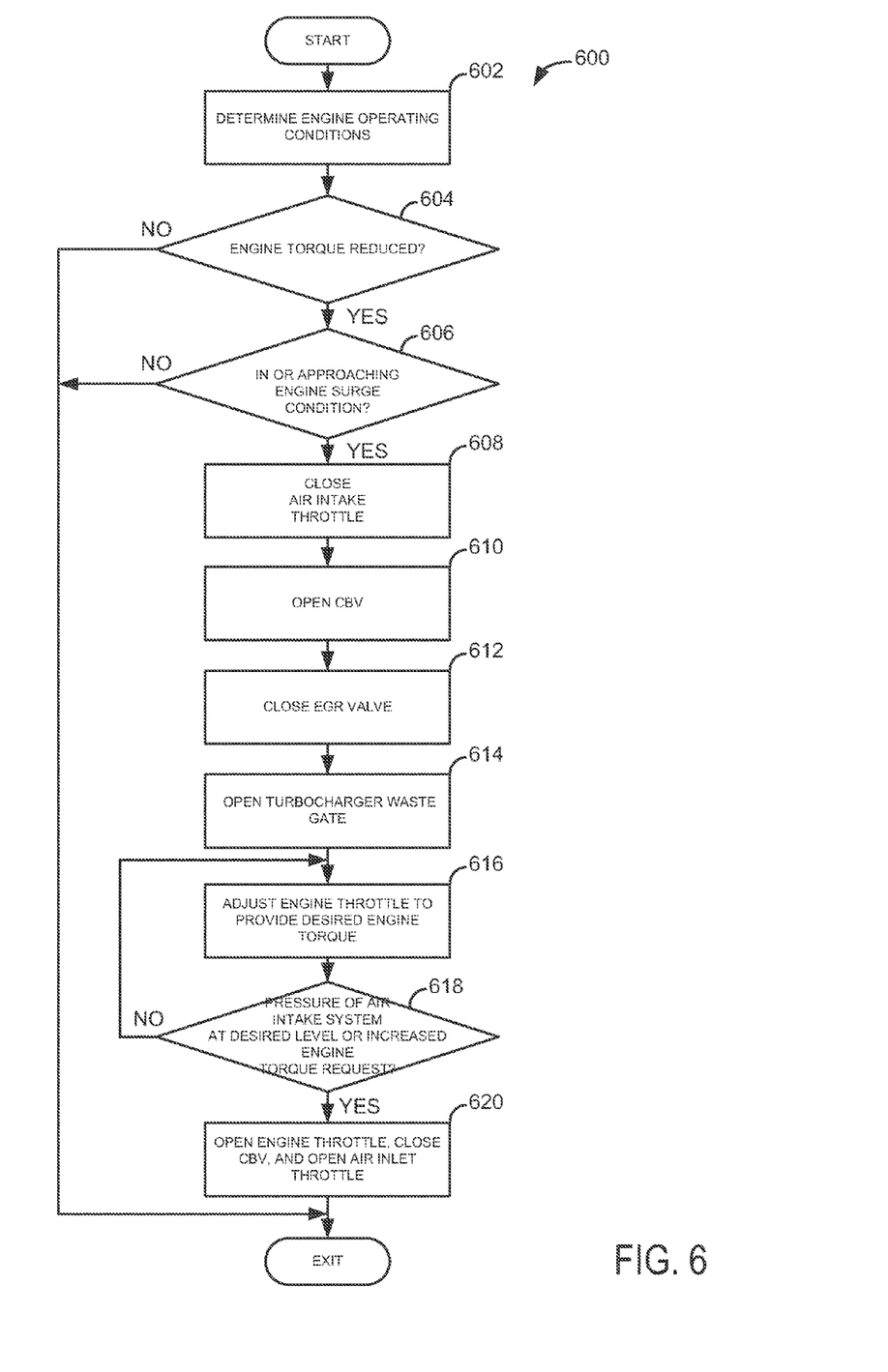
FIG. 6 shows a high level flowchart of a method for providing air to an engine.

Referring now to FIGS. 4 and 5, the plots and signals are similar to those described in FIGS. 2 and 3. Therefore, the description of FIGS. 4 and 5 will be limited to the differences between the figures for the sake of brevity.

At time $T_0$, the engine torque command is between a middle level and a higher level. The AIS throttle is partially closed so as to create a small pressure depression between the AIS throttle and the compressor. Since the EGR valve is also partially opened, EGR can flow to the engine at time $T_0$. The engine throttle is also partially open so that the engine receives an air amount for providing the commanded engine torque. The engine throttle inlet pressure is partially elevated so that air is available to provide the commanded engine torque. The turbocharger waste gate is also partially open at time $T_0$ and the compressor inlet pressure is slightly less than atmospheric pressure.

At time $T_1$, the engine torque is reduced and the AIS throttle is closed. Closing the AIS throttle reduces air flow into the compressor and the engine. The CBV is also opened in response to the decreasing engine torque command. Closing the AIS and opening the CBV reduces the possibility of the compressor entering a surge condition. Therefore, the AIS and CBV are adjusted to take preventive action against the possibility of surge. In one example, the CBV and AIS may be adjusted responsive to the derivative of the engine torque command during a decreasing engine torque demand. Further, the desired engine torque command may be required to be reduced by a predetermined amount before the CBV and AIS are adjusted. In still other examples, the CBV and AIS may be adjusted based on increasing delta pressure across the compressor and reduced flow through the compressor before the compressor enters a surge condition. For example, if compressor flow and delta pressure are approaching a surge line, the CBV may be opened and the AIS closed. The compressor inlet pressure also increases as compressed air from the compressor outlet is directed to the compressor inlet via the CBV.

At time $T_2$, the engine throttle begins to close so that the engine torque approaches the engine torque command. In this example, the engine throttle is closed shortly after the AIS throttle so that the AIS throttle reduces the possibility of the compressor entering a surge condition. In other examples, the AIS throttle may begin to close at substantially the same time as the engine throttle, but the AIS throttle may be closed at a higher rate than the engine throttle. Thus, the engine throttle and AIS throttle may begin to close at substantially the same time, but the AIS throttle reaches a closed position before the engine throttle. By closing the AIS throttle before the engine throttle, it may be possible to limit the pressure rise at the throttle input as shown at time $T_1$ to $T_3$. As shown at time $T_1$-$T_2$, the engine throttle inlet pressure does not rise, rather it decreases when the AIS throttle is closed. The turbocharger waste gate is opened to decrease compressor speed and the EGR valve is closed to reduce engine EGR.

At time $T_3$, the CBV is closed since pressure at the compressor inlet and outlet are substantially the same. In some examples, the CBV may remain open as long as the AIS throttle is closed.

Between time $T_3$ and time $T_4$, the AIS throttle is opened. In one example, the AIS throttle may be opened when a pressure of the air intake system decreases to a predetermined level. In other examples, the AIS throttle may be opened after a predetermined amount of time or after a predetermined number of engine events (e.g., combustion events or cylinder cycles). The engine torque command is slowly increased and the engine throttle follows the engine torque command to provide the desired level of engine torque. The engine throttle inlet pressure also increases with the increasing engine torque command. The compressor inlet pressure decreases to a level slightly less than atmospheric pressure.

Between time $T_4$ and time $T_5$, the engine torque command decreases, but like the example of FIGS. 2 and 3, the engine torque command is not decreased to a level where the AIS throttle is closed.

At time $T_6$, the engine torque command is reduced such that a short time later the AIS throttle begins to close and the CBV is opened. The AIS throttle may be closed based on a rate of delta pressure change across the compressor and compressor flow. Alternatively, the AIS throttle may be closed as a function of rate of engine torque change or another engine parameter. The engine throttle inlet pressure begins to decrease in response to the AIS throttle closing as the engine continues to draw air from upstream of the engine throttle and downstream of the AIS throttle while the AIS throttle is closed. Consequently, the possibility of compressor surge may be reduced.

Near time $T_7$, the engine throttle begins to close. In this example, the engine throttle begins to close after the AIS starts to close. In other examples, the AIS throttle and the engine throttle may begin to close at the same time, but the AIS throttle may be closed at a faster rate. By delaying closing of the engine throttle, it may be possible to reduce or eliminate pressure rise at the engine throttle inlet so as to reduce the possibility of compressor surge.

At time $T_8$, the CBV is closed. The CBV may be closed in response to a pressure in the intake system increasing or decreasing to a predetermined level. The CBV may also be closed in response to an increasing torque command or other engine operating conditions as described with regard to FIGS. 2 and 3.

After time $T_8$, the air inlet throttle is opened. The air inlet throttle may be opened responsive to an engine torque request increasing or responsive to a pressure in the air intake system. Further, in some examples, the air inlet throttle may be opened in response to a predetermined amount of time or a predetermined counted number of engine events (e.g., combustion events or engine cycles).

Referring now to FIG. 6, a method for supplying air to an engine is shown. The method of FIG. 6 may be executed via instructions for controller 12 of FIG. 1.

At 602, method 600 determines engine operating conditions. In one example, engine operating conditions may include engine speed, engine torque command, engine temperature, engine air intake system pressure, number of combustion events or cylinder cycles from an engine event (e.g., change in engine torque), compressor flow, compressor delta pressure (e.g., pressure ratio across a compressor). Method 600 proceeds to 604 after engine operating conditions are determined.

At 604, method 600 judges whether or not engine torque is being reduced. In other examples, method 600 may also judge whether or not a pressure of the engine is increased or decreased. If method 600 judges a change in pressure (e.g., an increase in throttle inlet pressure or an increase in compressor delta pressure) or a decrease in engine torque, method 600 proceeds to 606. Otherwise, method 600 exits.

At 606, method 600 judges whether or not a compressor of the engine is approaching or in a surge condition. In alternative examples, method 600 may require the intake system pressure or engine torque demand to change by a predetermined amount for method 600 to proceed to 606. If method 600 judges either the compressor is in or approaching a surge condition or a change in the engine torque command is greater than a predetermined amount, method 600 proceeds to 608.

At 608, method 600 closes the AIS throttle. The AIS throttle may be fully closed or it may be partially closed. In one example, the AIS throttle may be closed to an opening amount that reduces engine air intake system noise to less than a predetermined threshold value. In other examples, the AIS throttle may be substantially fully closed so as to conserve compressed air within the engine air intake system. Method 600 proceeds to 610 after closing the air intake throttle.

The AIS throttle may be begin to be closed before the engine throttle begins to close. Alternatively, the AIS may close at a faster rate than the engine throttle. In other examples, the engine throttle may close before the AIS throttle.

At 610, method 600 opens the CBV. In one example, the CBV may be adjusted to a fully open or fully closed position. The CBV may be electrically operated or it may be vacuum operated. Method 600 proceeds to 612 after the CBV is opened.

At 612, method 600 closes an EGR valve. The EGR valve may be electrically operated or it may be vacuum operated. In some examples, the EGR valve may be closed substantially simultaneously with a decrease in the engine torque demand.

At 614, method 600 opens a turbocharger waste gate. The turbocharger waste gate may be operated electrically or by vacuum. Further, the waste gate may be fully opened or partially opened. By opening the waste gate less exhaust energy may be delivered to rotate the compressor. Method 600 proceeds to 616 after the waste gate is opened.

At 616, method 600 adjusts the engine throttle to provide a desired amount of engine torque. In one example, the throttle position is adjusted according to the pressure difference across the throttle and a desired flow rate of air through the throttle. The desired flow rate of air through the throttle may be related to the engine torque command. Method 600 proceeds to 618 after the engine throttle position is adjusted.

At 618, method 600 judges whether an engine air inlet or passage pressure is less than a desired level or if the engine torque command is increasing. The air inlet pressure may be a compressor inlet pressure, a compressor outlet pressure, a delta pressure across the compressor, or a pressure of the engine intake manifold. In some examples, the engine torque request may have to change by a predetermined amount for method 600 to proceed to 620. In other examples, a predetermined number of engine events (e.g., combustion events or cylinder cycles) may have to be counted after entering method 600 at 608 before proceeding to 620. In still other examples, a predetermined amount of time may have to elapse since entering method 600 at 608 before proceeding to 620. If one condition or a combination or a sub-combination of the conditions is determined, method 600 proceeds to 620. Otherwise, method 600 returns to 616 so that the desired engine torque is provided.

At 620, method 620 opens the engine throttle, closes the CBV and opens the AIS. In some examples, the engine throttle is opened before the AIS throttle, and the AIS throttle is not opened until a pressure of the air intake system is less than a predetermined level. For example, the AIS throttle may be opened after pressure upstream of the compressor is less than atmospheric pressure. The AIS may open after the CBV is closed or vice-versa. Further, the EGR valve and turbocharger waste gate may be returned to operation that may be related to engine speed and engine load conditions. Method 600 exits after opening the AIS throttle.

Note that the operations described from 608 to 616 may be performed in alternative orders. For example, 616 may be moved to 608 or an alternative location to alter the order of operation. Further, in some examples additional or fewer operations may be included along with operations 608-616.

As will be appreciated by one of ordinary skill in the art, the methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for supplying air to an engine, comprising:
    controlling air flow to a compressor via a first throttle;
    controlling air flow from the compressor to engine cylinders via a second throttle;
    at least partially closing the first throttle during a condition of surge of the compressor; and
    adjusting a position of the first throttle in response to a desired EGR flow rate when the compressor is not in the condition of surge.

2. The method of claim 1, where the first throttle is substantially fully closed during the condition of surge of the compressor.

3. The method of claim 1, further comprising where the first throttle is not opened until a pressure of an air intake system of the engine is less than a predetermined level or until an engine torque request is greater than a predetermined level.

4. The method of claim 1, further comprising where the first throttle is not opened until a predetermined amount of time has elapsed or until a predetermined number of combustion events have occurred.

5. The method of claim 1, further comprising opening the second throttle before opening the first throttle, and opening the first throttle when a pressure of an air duct is less than a predetermined level.

6. The method of claim 1, further comprising opening a compressor bypass valve during the condition of surge of the compressor.

7. The method of claim 6, further comprising closing an EGR valve during the condition of surge of the compressor.

8. A method for supplying air to an engine, comprising:
    in response to a transition of engine torque demand or a change in engine air intake system pressure;
    at least partially closing a first throttle of an engine air intake system to reduce a possibility of surge of a compressor, the first throttle, being positioned upstream of the compressor, controlling air flow to the compressor;
    at least partially closing a second throttle of the engine air intake system to provide a desired amount of engine torque, the second throttle, being positioned downstream of the compressor, controlling air flow to cylinders of the engine; and
    opening a compressor bypass valve, being positioned in a bypass around the compressor, in response to the transition of the engine torque demand.

9. The method of claim 8, where during the at least partial closing of the first throttle and during the at least partial closing of the second throttle, the first throttle is closed at a faster rate than the second throttle.

10. The method of claim 8, where the first throttle begins to close before the second throttle and where the second throttle is opened before the first throttle, and opening the first throttle when a pressure of an air duct is less than a predetermined level.

11. The method of claim 8, where the first throttle is not closed unless a transition from a higher engine torque demand to a lower engine torque demand exceeds a predetermined change.

12. A method for supplying air to an engine, comprising:
   in response to a transition from a higher engine torque demand to a lower engine torque demand or a change in engine air intake system pressure:
   at least partially closing a first throttle of an engine air intake system to reduce a possibility of surge of a compressor, the first throttle controlling air flow to the compressor;
   at least partially closing a second throttle of the engine air intake system to provide a desired amount of engine torque, the second throttle controlling air flow to cylinders of the engine; and
   adjusting a position of a turbocharger waste gate in response to the transition from the higher engine torque demand to the lower engine torque demand.

* * * * *